US012611685B1

(12) United States Patent
Fan

(10) Patent No.: US 12,611,685 B1
(45) Date of Patent: Apr. 28, 2026

(54) ATOMIZING SPRAY GUN

(71) Applicant: Ningbo Xinchen Intelligent Electrical Appliance Co., Ltd, Zhejiang (CN)

(72) Inventor: Jidong Fan, Zhejiang (CN)

(73) Assignee: Ningbo Xinchen Intelligent Electrical Appliance Co., Ltd, Zhejiang (CN)

( * ) Notice: Subject to any disclaimer, the term of this patent is extended or adjusted under 35 U.S.C. 154(b) by 0 days.

(21) Appl. No.: 19/090,850

(22) Filed: Mar. 26, 2025

(30) Foreign Application Priority Data

Dec. 19, 2024 (CN) ......................... 202423159609.1

(51) Int. Cl.
*B05B 7/06* (2006.01)
*B05B 7/08* (2006.01)

(52) U.S. Cl.
CPC ............ *B05B 7/066* (2013.01); *B05B 7/0815* (2013.01)

(58) Field of Classification Search
CPC .............................. B05B 7/066; B05B 7/0815
USPC ........................................ 239/422, 423, 424
See application file for complete search history.

(56) References Cited

U.S. PATENT DOCUMENTS 2,101,175 A * 12/1937 Gustafsson ........... B05B 7/0815 239/290
7,163,160 B2 * 1/2007 Liu ....................... B05B 7/0815 239/428
2014/0061336 A1 * 3/2014 Kosaka ................. B05B 7/0815 239/424

* cited by examiner

*Primary Examiner* — Christopher S Kim
(74) *Attorney, Agent, or Firm* — Hawaii Patent Services; Nathaniel K. Fedde; Kenton N. Fedde

(57) ABSTRACT

The present disclosure provides an atomizing spray gun, which comprises a gun body assembly, an atomization material canister, a fastening nut, a nozzle assembly, and an atomization air cap. The nozzle assembly and the atomization air cap are sequentially arranged on one side of the gun body assembly. The fastening nut presses the nozzle assembly and the atomization air cap onto the gun body assembly. A conical spray head part is arranged in the middle of the nozzle assembly. An atomization central orifice that fits the spray head part is arranged in the middle of the atomization air cap. Two atomization protrusions are symmetrically arranged on a side of the atomization air cap away from the nozzle assembly.

17 Claims, 8 Drawing Sheets

ATOMIZING SPRAY GUN

CROSS-REFERENCE TO RELATED APPLICATIONS

This application claims priority to the Chinese patent application No. 202423159609.1, titled "Atomizing Spray Gun", filed on Dec. 19, 2024. The entire content of the above-mentioned application and its modified content are incorporated into this application by reference.

TECHNICAL FIELD

The present disclosure relates to the technical field of spray guns, and particularly relates to an atomizing spray gun.

BACKGROUND

A spray gun is a device that uses the rapid release of liquid or compressed air as power. Spray guns are divided into two types: ordinary pressure type and pressurized type. When the compressed air generated by the air compressor is ejected through the air cap at the front of the spray gun, a low-pressure area lower than the atmospheric pressure is created at the front of the connected paint nozzle. The pressure difference created at the spray gun nozzle sucks the paint out of the paint storage tank and atomizes it into particles to be sprayed on the surface of the object to be painted under the action of the high-speed ejection force of the compressed air.

In the prior art, the Chinese utility model patent with the publication number CN218655052U discloses a spray gun atomization wide-width adjustment and control structure, which includes a gun body, a fastening nut, an accommodation space, a nozzle assembly, an air cap assembly, and a control assembly. The nozzle assembly includes an air door plate, a nozzle, and a door plate air passage. The air cap assembly includes an atomization air cap, a through-hole, and an air passage. The control assembly includes an amplitude-adjustment dial block. An amplitude-adjustment spray block is installed on the atomization air cap. The amplitude-adjustment spray block is connected to the atomization air cap through an elastic member. The amplitude-adjustment dial block is provided with a guide surface, and the amplitude-adjustment spray block is provided with a guiding surface. By installing the amplitude-adjustment spray block on the atomization air cap to form a combined part, and connecting the atomization air cap and the amplitude-adjustment spray block through the elastic member, the amplitude-adjustment spray block is pre-pressed in the initial state and forms an initial fixed angle. Then, the guide surface on the amplitude-adjustment dial block rotates to drive the guiding surface of the amplitude-adjustment spray block, so that the amplitude-adjustment spray block rotates and changes in angle, changing the angle and position of the atomization air duct, and further controlling the atomization wide-width size of the sprayed liquid. However, the spraying ability of the spray gun in the prior art is relatively uneven, and the suppression of spraying scattered points cannot be achieved, thus affecting its spraying effect.

Therefore, there is a need to propose a new type of atomizing spray gun to solve the above-mentioned problems.

SUMMARY

The present disclosure provides an atomizing spray gun to solve the problems raised in the above background art.

In order to achieve the above-mentioned disclosure purpose, the present disclosure adopts the following technical solutions:

An atomizing spray gun includes a gun body assembly, an atomization material canister, a fastening nut, a nozzle assembly, and an atomization air cap, wherein the atomization material canister is installed on the gun body assembly, the nozzle assembly and the atomization air cap are sequentially arranged on one side of the gun body assembly, and the fastening nut presses the nozzle assembly and the atomization air cap onto the gun body assembly; and wherein a conical spray head part is arranged in a middle section of the nozzle assembly, an atomization central orifice that fits the spray head part is arranged in a middle section of the atomization air cap, and two atomization protrusions are symmetrically arranged on a side of the atomization air cap away from the nozzle assembly, wherein, two U-shaped atomization auxiliary grooves are symmetrically arranged on an outer side of the atomization central orifice, gas is ejected from the atomization central orifice and the atomization auxiliary grooves to atomize a liquid ejected from the spray head part; and penetrating external atomization spray holes are symmetrically arranged on the two atomization protrusions. And an included angle formed by the axes of the two external atomization spray holes is X, where 30°≤X≤100°.

The present disclosure further provides an atomizing spray gun, including a gun body assembly a nozzle assembly installed on the gun body assembly, and an atomization air cap cooperating with the nozzle assembly, wherein, a middle section of the nozzle assembly is provided with a conical spray head part, a middle section of the atomization air cap is provided with an atomization central orifice that fits the spray head part, and two atomization protrusions are symmetrically arranged on a side of the atomization air cap away from the nozzle assembly; and two U-shaped atomization auxiliary grooves are symmetrically arranged on an outer side of the atomization central orifice, and gas is ejected from the atomization central orifice and the atomization auxiliary grooves to atomize a liquid ejected from the spray head part; and wherein two penetrating external atomization spray holes are symmetrically arranged on the two atomization protrusions, and an included angle formed by the axes of the two external atomization spray holes is X, where 30°≤X≤100°.

BRIEF DESCRIPTION OF DRAWINGS

The drawings, which form a part of this application, are used to provide a further understanding of the present disclosure. The schematic embodiments of the present disclosure and the descriptions thereof are used to explain the present disclosure and do not constitute an improper limitation of the present disclosure. In the drawings.

Figure 1:
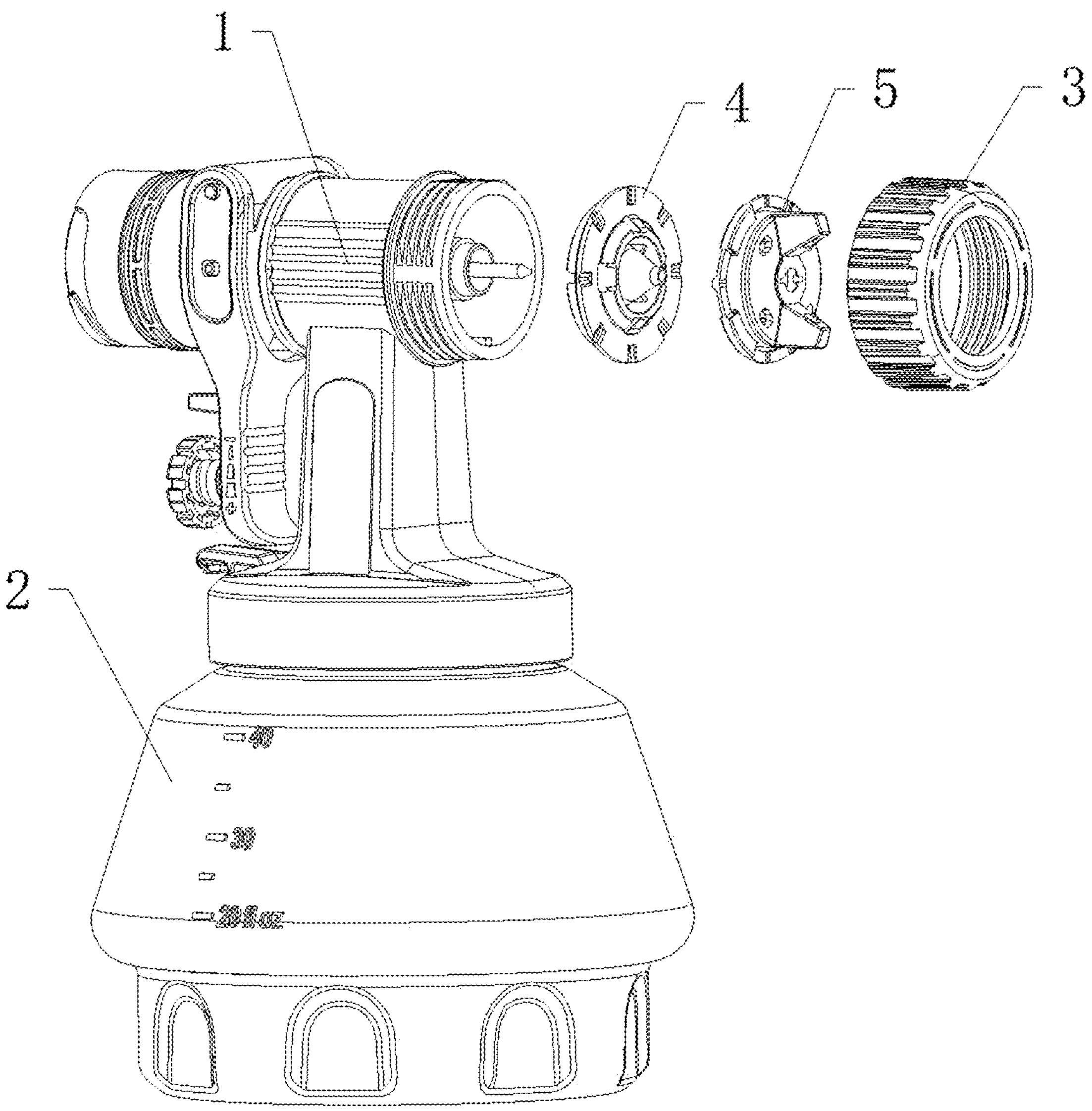
FIG. 1 is a schematic structural diagram of the present disclosure.

Reference signs: Gun body assembly (1); Atomization material canister (2); Fastening nut (3); Nozzle assembly (4); Spray head part (41); First end face (411); Beveled edge air intake port (42); Gear adjustment groove (43); Central airflow channel (44); Shaping airflow channel (45); Atomization air cap (5); Atomization central orifice (51); Atomization protrusion (52); External atomization spray hole (521); Atomization auxiliary groove (53); Air guide groove (54); Second end face (55); Elastic protrusion (56).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

As shown in FIGS. 1 to 8, an atomizing spray gun includes a gun body assembly 1, an atomization material canister 2, a fastening nut 3, a nozzle assembly 4, and an atomization air cap 5. The atomization material canister 2 is installed on the gun body assembly 1. The nozzle assembly 4 and the atomization air cap 5 are sequentially arranged on one side of the gun body assembly 1. The fastening nut 3 locks and fixes the nozzle assembly 4 and the atomization air cap 5 to the gun body assembly 1. A conical spray head part 1 is arranged in the middle of the nozzle assembly 4, and an atomization central orifice 51 that fits the spray head part 41 is arranged in the middle of the atomization air cap 5, enabling the liquid to form a uniform atomization effect under the action of gas. Two atomization protrusions 52 are symmetrically arranged on the side of the atomization air cap 5 away from the nozzle assembly 4. A positioning ring is arranged along the axial direction of the nozzle assembly 4, and a positioning boss that fits the positioning ring is arranged on the atomization air cap 5, facilitating the installation of the nozzle assembly 4 and the atomization air cap 5. A central airflow channel 44 is arranged on the inner ring of the nozzle assembly 4, and a shaping airflow channel 45 is arranged on the outer ring of the nozzle assembly 4, responsible for transporting gas. By rotating the fastening nut 3, the atomization air cap 5 and the nozzle assembly 4 are pressed against the gun body assembly 1. The panel on the nozzle assembly 4 is attached to the gun body assembly 1. The spray head part 41 is embedded in the atomization central orifice 51, and the positioning ring is embedded in the positioning boss, making the overall structure more compact, reducing air leakage, and improving the working efficiency of the spray gun.

In other embodiments (not shown), the connection method between the fastening nut 3 and the gun body assembly 1 can also be other connection methods such as clamping or plugging.

Figure 2:
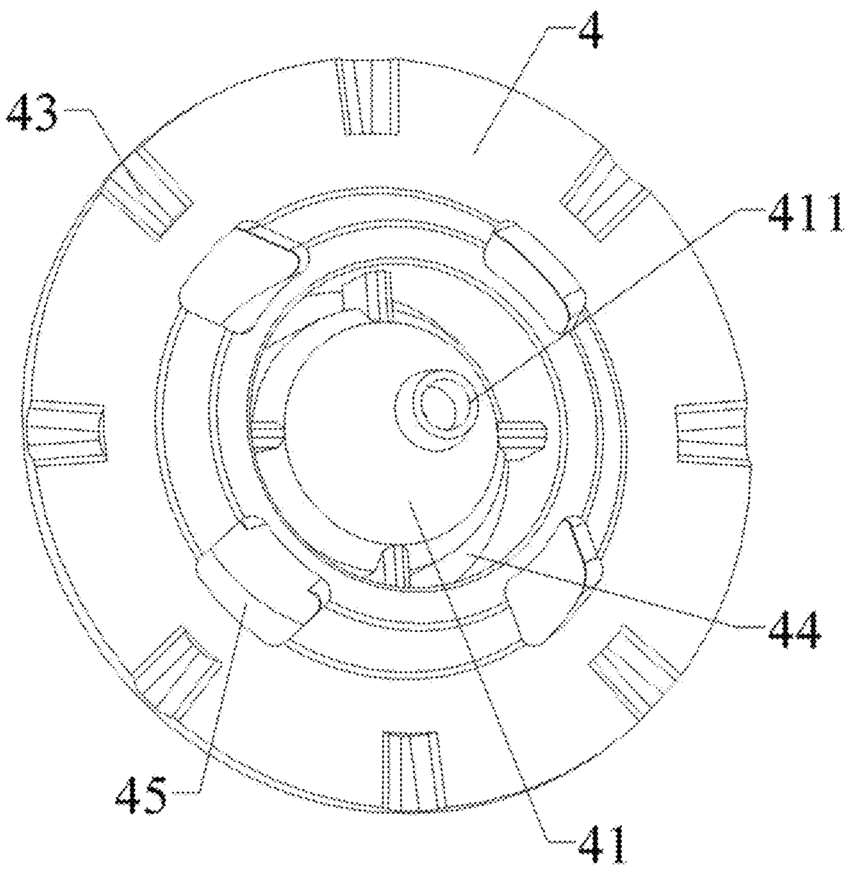
FIG. 2 is a schematic structural diagram of the nozzle assembly in the present disclosure.
Figure 4:
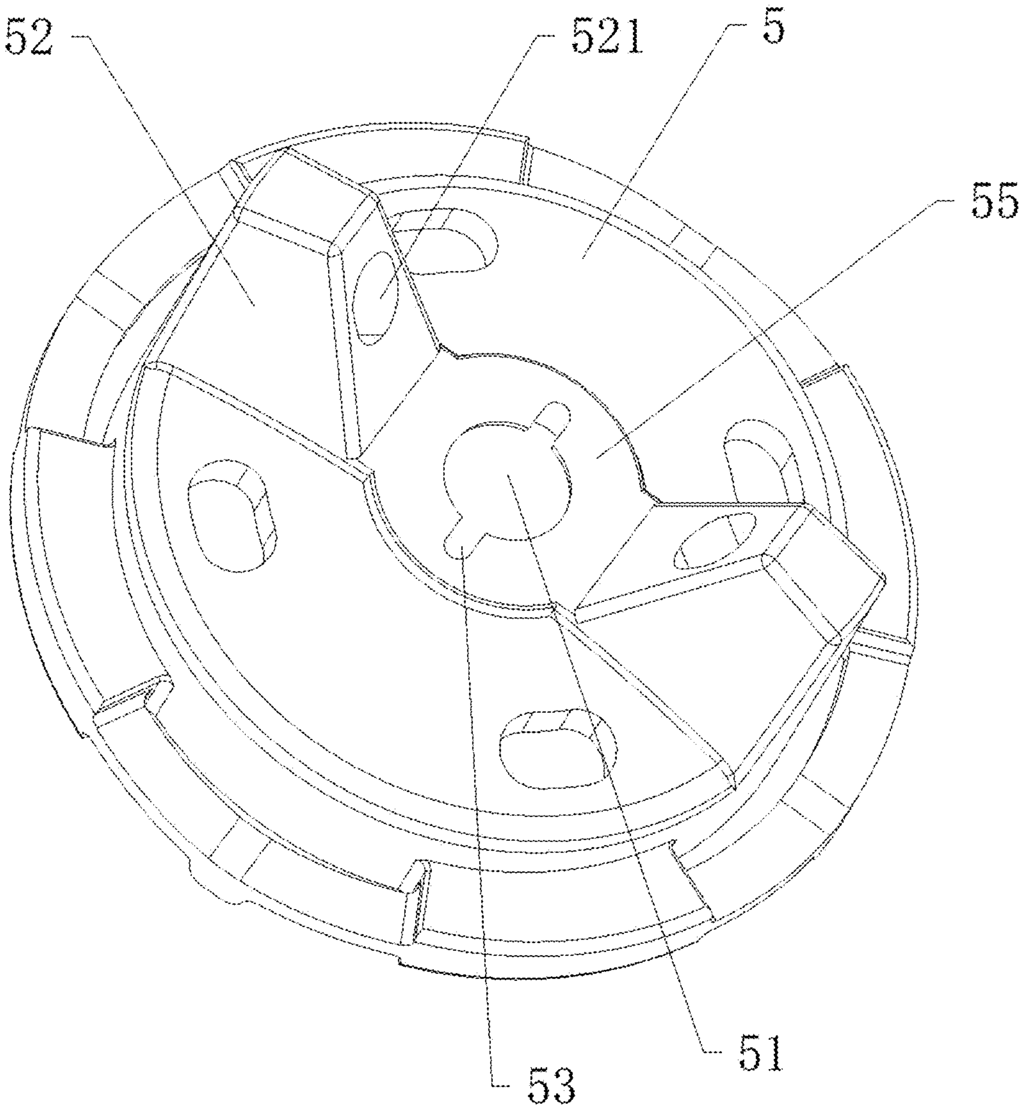
FIG. 4 is a schematic structural diagram of the atomization air cap of the present disclosure.
Figure 5:
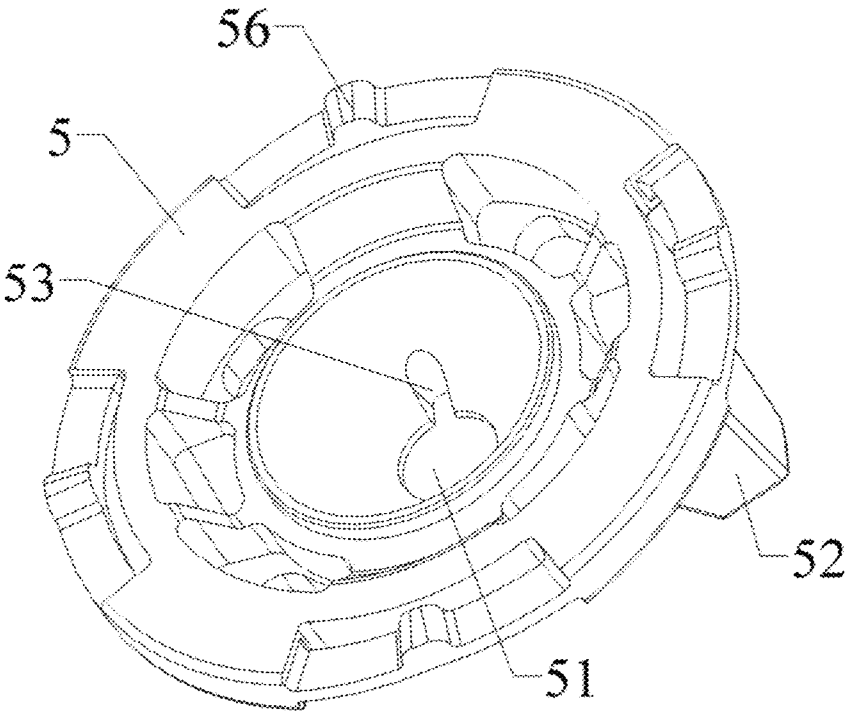
FIG. 5 is a schematic structural diagram of the atomization air cap of the present disclosure from another perspective.

Please refer to FIGS. 2, 4, and 5. In this embodiment, multiple gear adjustment grooves 43 are evenly distributed on the outer ring of the nozzle assembly 4. The gear adjustment grooves 43 are arranged at equal intervals along the circumferential direction of the nozzle assembly 4. The atomization air cap 5 is provided with elastic protrusions 56 that fit into the gear adjustment grooves 43. The elastic protrusions 56 and the gear adjustment grooves 43 cooperate with each other to form an annular positioning structure. There is no specific limitation on the number of gear adjustment grooves 43 and elastic protrusions 56, and the number of gear adjustment grooves 43 and elastic protrusions 56 can be set according to actual needs. The preferred number is 8 for both. By rotating the atomization air cap 5, the elastic protrusions 56 can engage with different gear adjustment grooves 43 in sequence. When the elastic protrusions 56 move from one gear adjustment groove 43 to another, the installation angle of the atomization protrusions 52 on the atomization air cap 5 also changes accordingly, thereby meeting the requirements for the spraying width and the scattering pattern angle in different spraying scenarios. This improves the flexibility of the operation of the atomizing spray gun, ensures the connection stability and accuracy during use, and enhances the overall spraying quality.

In other embodiments (not shown), the number of elastic protrusions 56 can be one or more, and the number of elastic protrusions 56 can be set according to actual needs.

Figure 7:
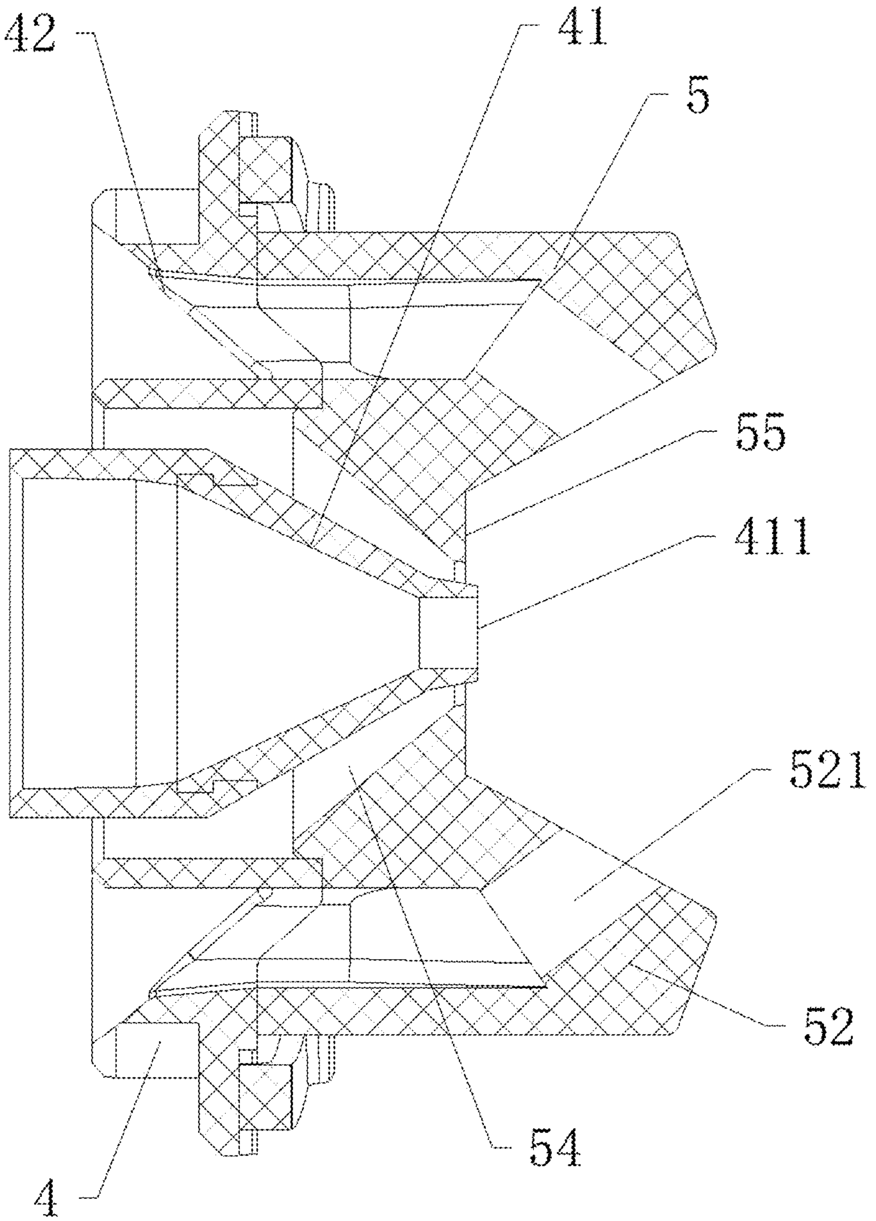
FIG. 7 is a cross-sectional view of the atomization air cap and the nozzle assembly of the present disclosure during assembly.
Figure 8:
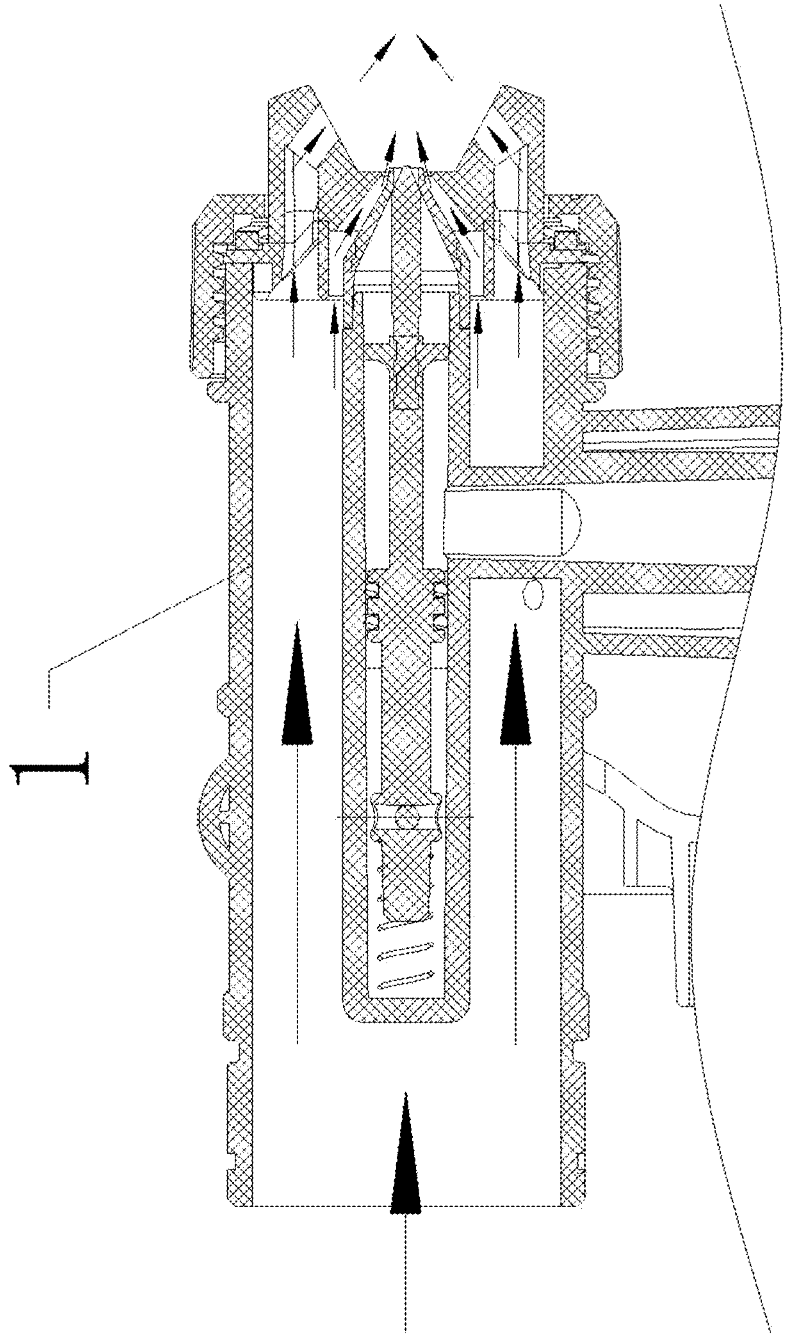
FIG. 8 is a schematic diagram of the gas flow direction when the gun body assembly of the present disclosure is in use.

Please refer to FIGS. 4 and 7. In this embodiment, two U-shaped atomization auxiliary grooves 53 are symmetrically arranged on the outer side of the atomization central orifice 51. During use, high-pressure gas is not only directly ejected from the atomization central orifice 51 but also ejected through these two U-shaped atomization auxiliary grooves 53 simultaneously, forming two airflows. This design enables the liquid ejected from the spray head part 41 to receive a more comprehensive and balanced impact when in contact with the airflows, thereby quickly breaking the liquid into fine droplets. The U-shaped structure of the atomization auxiliary grooves 53 helps to improve the process of liquid breakage and refinement, effectively suppressing the problems of circular and fan-shaped scattered points that are prone to occur during the atomization process and ensuring a more uniform and delicate spraying effect. Through this auxiliary atomization effect, the efficiency of liquid atomization is improved, and the coating defects that may be caused by uneven droplet sizes are reduced. The atomization auxiliary grooves 53 can effectively assist in suppressing the circular and fan-shaped scattered points during atomization.

Figure 6:
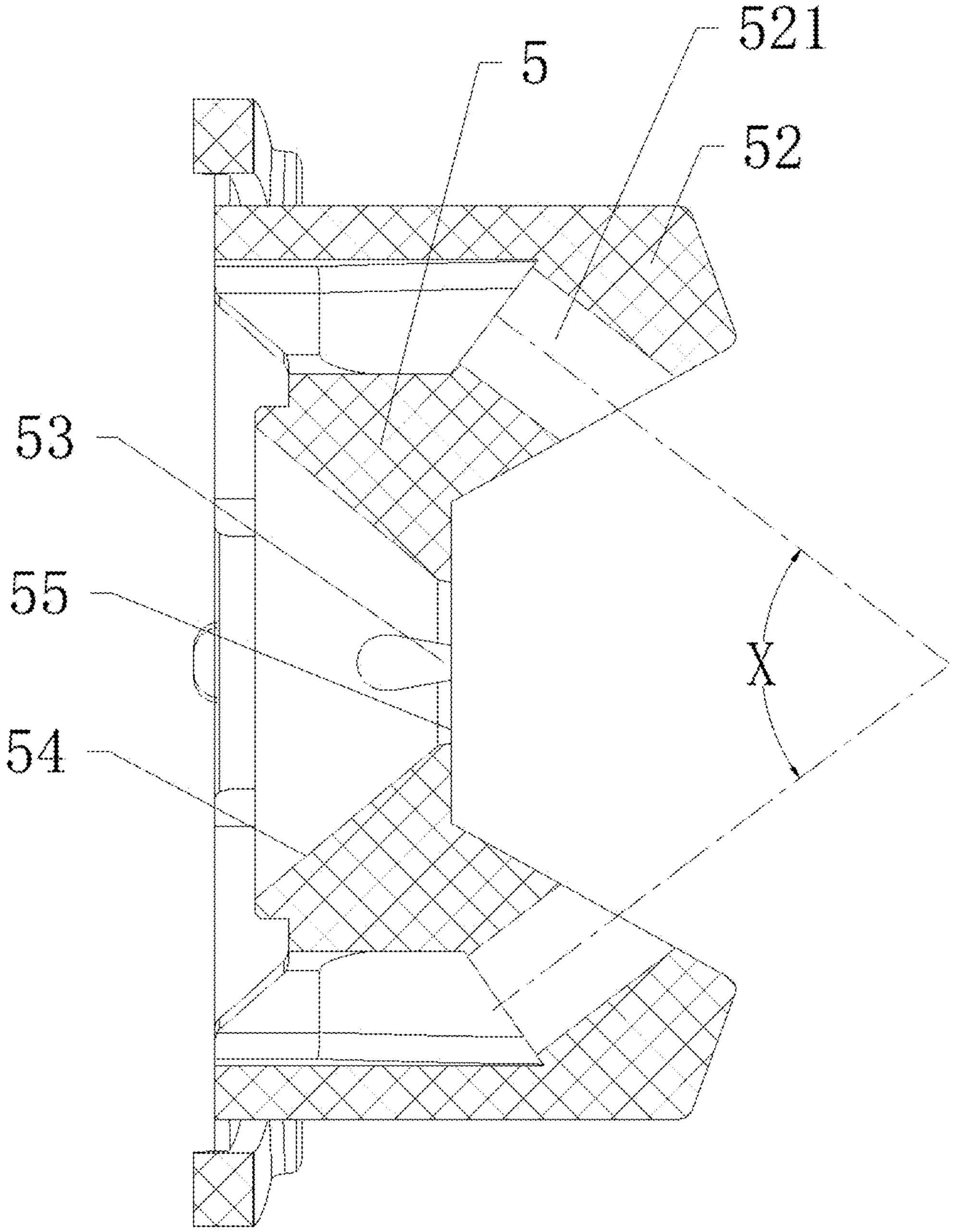
FIG. 6 is a cross-sectional view of the atomization air cap of the present disclosure.

Please refer to FIGS. 6 and 7. In this embodiment, the two atomization protrusions 52 are symmetrically provided with penetrating external atomization spray holes 521, and the external atomization spray holes 521 are oblong holes. The oblong hole structure helps to ensure a relatively uniform distribution of the airflow when it is ejected. The included angle formed by the axes of the two external atomization spray holes 521 is X, and the range of the included angle X is 30°≤X≤100°. Among them, the angle of X is preferably set to 75°. When the angle of X is 75°, the high-pressure airflow ejected from the external atomization spray holes 521 can intersect with each other after being ejected, and an effective airflow gathering area is formed at the spray head part 41, which can break the liquid into finer droplets and improve the overall atomization effect.

In addition, the distance between the intersection point of the axes of the external atomization spray holes 521 on both sides and the spray head part 41 is 10 mm-25 mm, and it is preferably set to 18 mm. The distance of 18 mm allows the airflow and the liquid to be fully mixed within a short distance, prompting the liquid to disperse into fine and uniform particles at the moment of ejection. At the same time, it prevents premature diffusion or droplet aggregation, ensures uniform and stable atomization in the spraying area, avoids the phenomenon of uneven droplet size due to insufficient mixing, effectively improves the atomization performance of the spray gun, ensures the fineness of liquid atomization, and improves the overall spraying quality of the atomizing spray gun.

In another embodiment (not shown), the external atomization spray holes 521 can also be perfectly circular.

Please refer to FIGS. 2 and 6 to 8. In this embodiment, a conical air guide groove 4 is provided on the inner side of the atomization air cap 5. The narrow end of the air guide groove 54 is connected to the atomization central orifice 51. The spray head part (spray head part) 41 is embedded in the air guide groove 54. The gas is transported through the internal channel of the gun body assembly 1 to the central airflow channel 44 and discharged from the air guide groove 54. The air guide groove 54 uses its conical structure to effectively guide and pressurize the airflow, so that the airflow rapidly gathers during the contraction process and forms a concentrated airflow with high wind speed when released. The taper of the air guide groove 54 is greater than that of the spray head part 41, which improves the gathering effect of the air guide groove 54 on the gas, thereby further enhancing the liquid atomization effect and making the air volume and wind speed highly concentrated. The air guide groove 54 can guide the gas to flow in a predetermined direction, making the gas flow more smoothly, thus avoiding unnecessary resistance caused by the direct vertical impact of the gas on the inner wall of the atomization air cap 5. Such vertical impact will cause partial loss of wind energy and may lead to the phenomenon of return air and increased noise. By optimizing the gas flow path, the problems of wind energy loss and return air noise are reduced, ensuring that the high-pressure gas can fully mix with the liquid sprayed from the spray head part 41 in the shortest distance to achieve a more delicate and uniform atomization effect.

Figure 3:
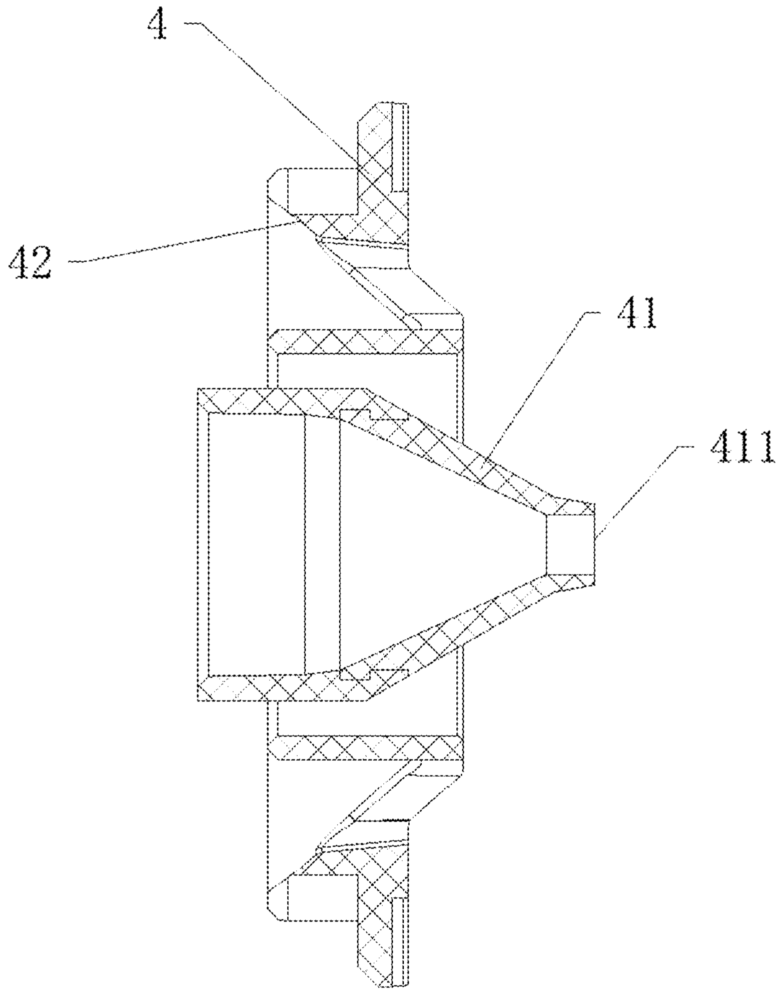
FIG. 3 is a cross-sectional view of the nozzle assembly of the present disclosure.

Please refer to FIGS. 3 and 6. In this embodiment, a beveled edge air intake port (beveled edge air intake port) 42 is provided on the nozzle assembly 4. The beveled edge air intake port 42 is connected to the external atomization spray hole 521 through the shaping airflow channel 45. The gas is transported through the internal channel of the gun body assembly 1 to the beveled edge air intake port 42. The beveled edge air intake port 42 gathers the gas through the shaping airflow channel 45 and then transports it to the external atomization spray hole 521 for spraying. By guiding and pressurizing the gas, the gas rapidly gathers during the contraction process and forms a concentrated gas with high wind speed when released, making the air duct more smooth and reducing the resistance caused by the direct vertical impact of the gas on the inner wall of the atomization air cap 5, thus preventing the loss of wind energy and the generation of return air noise caused by gas collision.

Please refer to FIG. 7. In this embodiment, the end face of the spray head part 41 on the side away from the gun body assembly 1 is defined as the first end face 411, and the side of the atomization air cap 5 away from the gun body assembly 1 is defined as the second end face 55. The first end face 411 protrudes from the second end face 55, and the distance Y, Y that the first end face 411 protrudes from the second end face 55 ranges from 0 mm<Y≤1 mm, where Y is preferably set to 0.5 mm. Through this slightly convex design, the atomization effect of the nozzle assembly 4 on the liquid can be effectively improved. When the gas is ejected through the atomization central orifice 51 and the atomization auxiliary groove 53, the gas can more uniformly wrap and shear the liquid ejected from the spray head part 41, so that the liquid forms more uniform atomized particles at the moment of leaving the nozzle, improving the atomization quality and spraying uniformity. In addition, this structure can also reduce the retention of the liquid on the nozzle end face, reduce the spraying instability caused by liquid accumulation, and enable the spray gun to maintain a stable spraying effect during use, thereby improving the spraying accuracy and work efficiency.

In summary, it can be seen from the above description that the present disclosure has achieved the following technical effects:

By adding a U-shaped atomization auxiliary groove 53 outside the atomization central orifice 51, under the synergistic effect of the U-shaped atomization auxiliary groove 53 and the atomization central orifice 51, the atomization effect is further enhanced, the atomization of the ejected liquid is more uniform, the phenomenon of uneven spraying is reduced, and circular and fan-shaped scattered points are suppressed. The external atomization spray holes 521 are designed with a preferred included angle of 75°, which promotes the intersection of the airflows to form a focused atomization area, further atomizes the liquid, improves the spraying uniformity, and guides the gas to gather at high speed through the conical air guide groove 54, reducing the wind energy loss, reducing the return air noise, and enhancing the mixing efficiency of the gas and the liquid at the same time. The first end face 411 of the spray head part 41 protrudes from the second end face 55 of the atomization air cap 5, and the protruding distance is 0.5 mm, which can reduce the retention of the liquid on the spray head part 41, prevent uneven spraying caused by material accumulation, and ensure the continuous and stable atomization process.

In the description of the present disclosure, it should be appreciated that directional terms such as “front, rear, up, down, left, right”, “horizontal, vertical, perpendicular, horizontal” and “top, bottom” etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms “inside, outside” refer to the inside and outside relative to the contour of each component itself.

For the convenience of description, spatial relative terms such as “on . . . ”, “above . . . ”, “on the upper surface of . . . ”, “upper” etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as “above other devices or structures” or “on other devices or structures” will subsequently be positioned as “below other devices or structures” or “under other devices or structures”. Thus, the exemplary term “above” can include both “above” and “below” orientations. The device can also be positioned in other different ways (rotated 90 degrees or in other orientations), and the spatial relative descriptions used here should be interpreted accordingly.

In addition, it should be noted that the use of terms such as “first”, “second” etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An atomizing spray gun, comprising a gun body assembly, an atomization material canister, a fastening nut, a nozzle assembly, and an atomization air cap, wherein the atomization material canister is installed on the gun body assembly, the nozzle assembly and the atomization air cap are sequentially arranged on one side of the gun body assembly, and the fastening nut presses the nozzle assembly and the atomization air cap onto the gun body assembly; and wherein a conical spray head part is arranged in a middle section of the nozzle assembly, an atomization central orifice that fits the spray head part is arranged in a middle section of the atomization air cap, and two atomization protrusions are symmetrically arranged relative to the atomization central orifice on a side of the atomization air cap away from the nozzle assembly, wherein, two U-shaped atomization auxiliary grooves are symmetrically arranged on an outer side of the atomization central orifice, a gas is ejected from the atomization central orifice and the atomization auxiliary grooves to atomize a liquid ejected from the spray head part; and two penetrating external atomization spray holes are symmetrically arranged relative to the atomization central orifice on each of the two atomization protrusions; and an included angle formed by an intersection of respective axes of each of the two penetrating external atomization spray holes is X, where 30°≤X≤100°; and wherein the nozzle assembly is provided with a plurality of gear adjustment grooves, the atomization air cap is provided with at least one elastic protrusion, and the at least one elastic protrusion is selectively engaged with any one of the plurality of gear adjustment grooves by rotating the atomization air cap to switch an angle of the two atomization protrusions relative to the nozzle assembly.

2. The atomizing spray gun according to claim 1, wherein the penetrating external atomization spray holes are oblong holes.

3. The atomizing spray gun according to claim 1, wherein the angle of X is 75°.

4. The atomizing spray gun according to claim 1, wherein a conical air guide groove is arranged on an inner side of the atomization air cap, and a narrow end of the air guide groove is connected to the atomization central orifice; and wherein the spray head part is embedded in the air guide groove, and a taper of the air guide groove is greater than that of the spray head part.

5. The atomizing spray gun according to claim 1, wherein a beveled edge air intake port is arranged on the nozzle assembly, and the beveled edge air intake port is connected to the penetrating external atomization spray holes.

6. The atomizing spray gun according to claim 1, wherein an end face of the spray head part on a side away from the gun body assembly is a first end face, a side of the atomization air cap away from the gun body assembly is a second end face, and the first end face protrudes from the second end face.

7. The atomizing spray gun according to claim 6, wherein, a distance by which the first end face protrudes from the second end face is Y, where 0 mm<Y≤1 mm.

8. The atomizing spray gun according to claim 7, wherein the Y is 0.5 mm.

9. An atomizing spray gun, comprising a gun body assembly (1), a nozzle assembly (4) installed on the gun body assembly, and an atomization air cap (5) cooperating with the nozzle assembly, wherein, a middle section of the nozzle assembly (4) is provided with a conical spray head part, a middle section of the atomization air cap (5) is provided with an atomization central orifice that fits the spray head part, and two atomization protrusions are symmetrically arranged relative to the atomization central orifice on a side of the atomization air cap away from the nozzle assembly; and two U-shaped atomization auxiliary grooves are symmetrically arranged on an outer side of the atomization central orifice, and a gas is ejected from the atomization central orifice and the atomization auxiliary grooves to atomize a liquid ejected from the spray head part; and wherein two penetrating external atomization spray holes are symmetrically arranged relative to the atomization central orifice on each of the two atomization protrusions, and an included angle formed by an intersection of respective axes of each of the two penetrating external atomization spray holes is X, where 30°≤X≤100°;

wherein the nozzle assembly is provided with a plurality of gear adjustment grooves, the atomization air cap is provided with at least one elastic protrusion, and the at least one elastic protrusion is selectively engaged with any one of the gear adjustment grooves by rotating the atomization air cap to switch an angle of the two atomization protrusions relative to the nozzle assembly.

10. The atomizing spray gun according to claim 9, wherein the nozzle assembly and the atomization air cap are sequentially arranged on the gun body assembly through a fastening nut.

11. The atomizing spray gun according to claim 9, wherein the penetrating external atomization spray holes are oblong holes.

12. The atomizing spray gun according to claim 9, wherein the included angle X is 75°.

13. The atomizing spray gun according to claim 9, wherein a conical air guide groove is provided on an inner side of the atomization air cap, and a narrow end of the air guide groove is connected to the atomization central orifice; and wherein the spray head part is embedded in the air guide groove, and a taper of the air guide groove is greater than that of the spray head part.

14. The atomizing spray gun according to claim 9, wherein a beveled edge air intake port is provided on the nozzle assembly, and the beveled edge air intake port is connected to the external atomization spray holes.

15. The atomizing spray gun according to claim 9, wherein an end face of the spray head part away from the gun body assembly is a first end face, a side of the atomization air cap away from the gun body assembly is a second end face, and the first end face protrudes from the second end face.

16. The atomizing spray gun according to claim 15, wherein a distance by which the first end face protrudes from the second end face is Y, where $0\text{ mm} < Y \leq 1\text{ mm}$.

17. The atomizing spray gun according to claim 16, wherein the Y is 0.5 mm.

* * * * *